United States Patent
Hagano et al.

(10) Patent No.: US 7,281,640 B2
(45) Date of Patent: Oct. 16, 2007

(54) CAP DEVICE

(75) Inventors: Hiroyuki Hagano, Aichi-ken (JP); Masayuki Nakagawa, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 324 days.

(21) Appl. No.: 10/947,406

(22) Filed: Sep. 23, 2004

(65) Prior Publication Data

US 2005/0092752 A1 May 5, 2005

(30) Foreign Application Priority Data

Sep. 29, 2003 (JP) ............................. 2003-336708
Sep. 29, 2003 (JP) ............................. 2003-336712

(51) Int. Cl.
*B65D 55/16* (2006.01)
(52) U.S. Cl. ............................. 220/375; 220/DIG. 33
(58) Field of Classification Search ........ 220/DIG. 33, 220/288, 375
See application file for complete search history.

(56) References Cited

U.S. PATENT DOCUMENTS

| | | | |
|---|---|---|---|
| 5,462,190 A * | 10/1995 | Lienhart et al. | 220/375 |
| 5,720,409 A | 2/1998 | Asakura et al. | |
| 5,732,841 A * | 3/1998 | Jocic et al. | 220/203.24 |
| 5,924,590 A * | 7/1999 | Jocic et al. | 220/203.24 |
| 6,164,482 A * | 12/2000 | Araki et al. | 220/375 |
| 6,202,879 B1 * | 3/2001 | Gericke | 220/255 |
| 6,237,798 B1 * | 5/2001 | Sung | 220/375 |
| 6,332,553 B1 * | 12/2001 | Yamada et al. | 220/375 |
| 6,478,180 B1 * | 11/2002 | Dehn, Sr. | 220/375 |
| 7,025,222 B2 * | 4/2006 | Hagano et al. | 220/375 |
| 2001/0054829 A1 * | 12/2001 | Hagano et al. | 296/97.22 |
| 2003/0024931 A1 * | 2/2003 | Bae | 220/375 |
| 2003/0098307 A1 * | 5/2003 | Hagano et al. | 220/303 |
| 2003/0173362 A1 * | 9/2003 | Ishida et al. | 220/375 |
| 2004/0000554 A1 * | 1/2004 | Griffin et al. | 220/304 |
| 2005/0092752 A1 * | 5/2005 | Hagano et al. | 220/375 |

FOREIGN PATENT DOCUMENTS

| | | |
|---|---|---|
| DE | 198 20 544 A1 | 11/1999 |
| DE | 200 18 750 U1 | 5/2001 |
| JP | A-2000-507192 | 6/2000 |
| JP | A-2001-063388 | 3/2001 |

* cited by examiner

*Primary Examiner*—Anthony Stashick
*Assistant Examiner*—Christopher McKinley
(74) *Attorney, Agent, or Firm*—Posz Law Group, PLC

(57) ABSTRACT

A cap device of the invention has a tether mechanism, which is used to link a fuel cap to a fueling lid. The tether mechanism includes a cord-like flexible linkage body having one end as a first support end, which is fit in a support member of a rotating ring. The first support end is inserted from inside of the rotating ring through an insertion opening into a support recess. This fits the first support end in the support recess, while allowing the linkage body to be led through a lead opening. The first support end is accordingly fixed to the support member. The rotating ring is then attached to a circular groove formed on the fuel cap. The tether mechanism of this simple structure is readily fixed and thereby ensures easy attachment to the fuel cap.

7 Claims, 6 Drawing Sheets

CAP DEVICE

This application claims the benefit of and priority from Japanese Applications No. 2003-336708 filed Sep. 29, 2003 and No. 2003-336712 filed Sep. 29, 2003, the contents of which are incorporated herein by reference.

BACKGROUND OF THE INVENTION

1. Field of the Invention

The present invention relates to a cap device equipped with a tether mechanism for linking a cap used to open and close a tank opening to a peripheral member of the tank opening.

2. Description of the Related Art

In a fuel tank of automobiles, there is a known structure of linking a fuel cap to a peripheral member of a fuel inlet by means of a tether, in order to prevent the fuel cap from being lost during a fuel supply operation (see, for example, JP No. 2000-507192A). FIG. 8 shows a tether mechanism 100 of a prior art structure. The tether mechanism 100 includes a rotating ring 102 that is mounted in a freely rotatable manner on an outer circumference of a fuel cap (not shown), and a linkage member 110 with one end connected to the rotating ring 102 and the other end linked to a vehicle body. The rotating ring 102 and the linkage member 110 are made of a resin. The linkage member 110 is integrally formed and has a cord-like linkage body 112 and a support end 114 that is protruded from one end of the linkage body 112. The rotating ring 102 has a ring body 104 and a support member 106 that is formed as part of the ring body 104 to engage with the support end 114. The support member 106 has a support recess 106a that is open to the inner circumference of the ring body 104, an insertion opening 106b that is open upward the support recess 106a, and a lead opening 106c that is open outward in a radial direction of the support recess 106a.

The support end 114 of the linkage member 110 is fixed to the support member 106 of the rotating ring 102 according to the following procedure. The linkage body 112 is pressed into the insertion opening 106b in the direction of an arrow D1, and the support end 114 is pressed into the support recess 106a in the direction of an arrow D2. This fits the support end 114 in the support recess 106a, while enabling the linkage body 112 from being pulled through the lead opening 106c. The rotating ring 102 integrated with the linkage member 110 is then attached to the outer circumference of the fuel cap.

This fixation process requires the actions in the two different directions, that is, press-in of the linkage member 110 in the direction of the arrow D1 and in the direction of the arrow D2. There is a difficulty in automating such actions in the two different directions, since secure support of the linkage member 110 of flexible resin is demanded during the fixation. The press-in of the linkage body 112 into the narrow insertion opening 106b may result in breakage of the linkage body 112.

SUMMARY OF THE INVENTION

The object of the invention is to provide a cap device having a tether mechanism that ensures easy fixation of a linkage member to a rotating ring.

In order to attain at least part of the above and the other related objects, the present invention is directed to a cap device equipped with a tether mechanism for linking a cap used to open and close a tank opening to a peripheral member of the tank opening. The tether mechanism includes: a rotating ring that is mounted in a rotatable manner on a ring attachment element formed around an outer circumference of the cap; and a linkage member having a cord-like flexible linkage body, a first support end that is formed on one end of the linkage body and is coupled with one end of the rotating ring, and a second support end that is formed on the other end of the linkage body and is connectable with the peripheral member of the tank opening.

The rotating ring has a ring body that is held by the ring attachment element in a rotatable manner, and a support member that is formed in an inner circumference of the ring body for fixation of the first support end.

The support member includes: a support recess that has an insertion opening, which allows the first support end to be inserted outward in a radial direction from a center of the ring body, and receives the first support end fit therein; and a lead opening that connects with the support recess and is open to enable the linkage body to be led in an axial direction of the ring body.

In the structure of the cap device of the invention, the cap detached from the tank opening is held on the peripheral member of the tank opening via the linkage member. This structure effectively prevents the fuel cap from being lost or from being mistakenly kept open. The linkage member has the cord-like flexible linkage body with one end as the first support end, which is fixed to the support member of the rotating ring. The support member has the support recess connecting with the insertion opening that is open to the inner circumference of the ring body and with the lead opening that is open in the axial direction. The simple shift of the first support end from the insertion opening toward the support recess causes the first support end to be fit in the support recess, while enabling the linkage body to be led through the lead opening.

The simple shift of the first support end of the linkage member outward in the radial direction from the inner circumference of the ring body thus effectively fixes the first support end to the support member. This arrangement easily attains automation of such fixation.

In one preferable embodiment of the cap device of the invention, the ring body is made of an elastically deformable resin material and is mounted on the ring attachment element by applying an external force for expansion of a diameter of the ring body and subsequently removing the external force for contraction of the diameter.

Another embodiment is also directed to a cap device having a cap that engages with an opening engagement element formed on an inner wall of a tank opening to close the tank opening, and a holder mechanism that holds the cap detached from the tank opening on a peripheral body member of the tank opening. The cap has a closure body that opens and closes the tank opening, and a cap engagement element that is formed on an outer circumference of the closure body and engages with the opening engagement element. The holder mechanism includes an attachment groove that is formed around a whole outer circumference in a lower portion of the closure body and is located between the cap engagement element and a lower end of the closure body, and a cap holder that is provided on the body member and is fit in the attachment groove for holding the cap.

In the structure of the cap device of the embodiment, the cap engagement element of the cap engages with the opening engagement element formed on the inner wall of the tank opening, so that the closure body closes the tank opening. The cap detached from the tank opening is held by the holder mechanism. The cap holder is fit in the attachment groove formed around the whole outer circumference in the lower portion of cap, so that the cap is held on the body member. This structure gives the space for temporarily keeping the cap detached from the tank opening for fuel supply and thereby effectively prevents the cap from being lost.

The attachment groove of the holder mechanism is located between the lower end of the closure body and the cap engagement element. This structure does not interfere with attachment of the cap to the tank opening, that is, engagement of the cap engagement element with the opening engagement element formed on the inner wall of the tank opening. The attachment groove is extended around the whole outer circumference of the closure body. This ensures easy formation of the attachment groove integrally with the closure body.

The holder mechanism does not require a thick board to engage with the male thread element of the cap as discussed in the prior art but uses the cap holder of a thin plate to be set in the exclusive attachment groove.

DESCRIPTION OF THE PREFERRED EMBODIMENTS (1) General Structure of Fuel Cap 20

Figure 1:
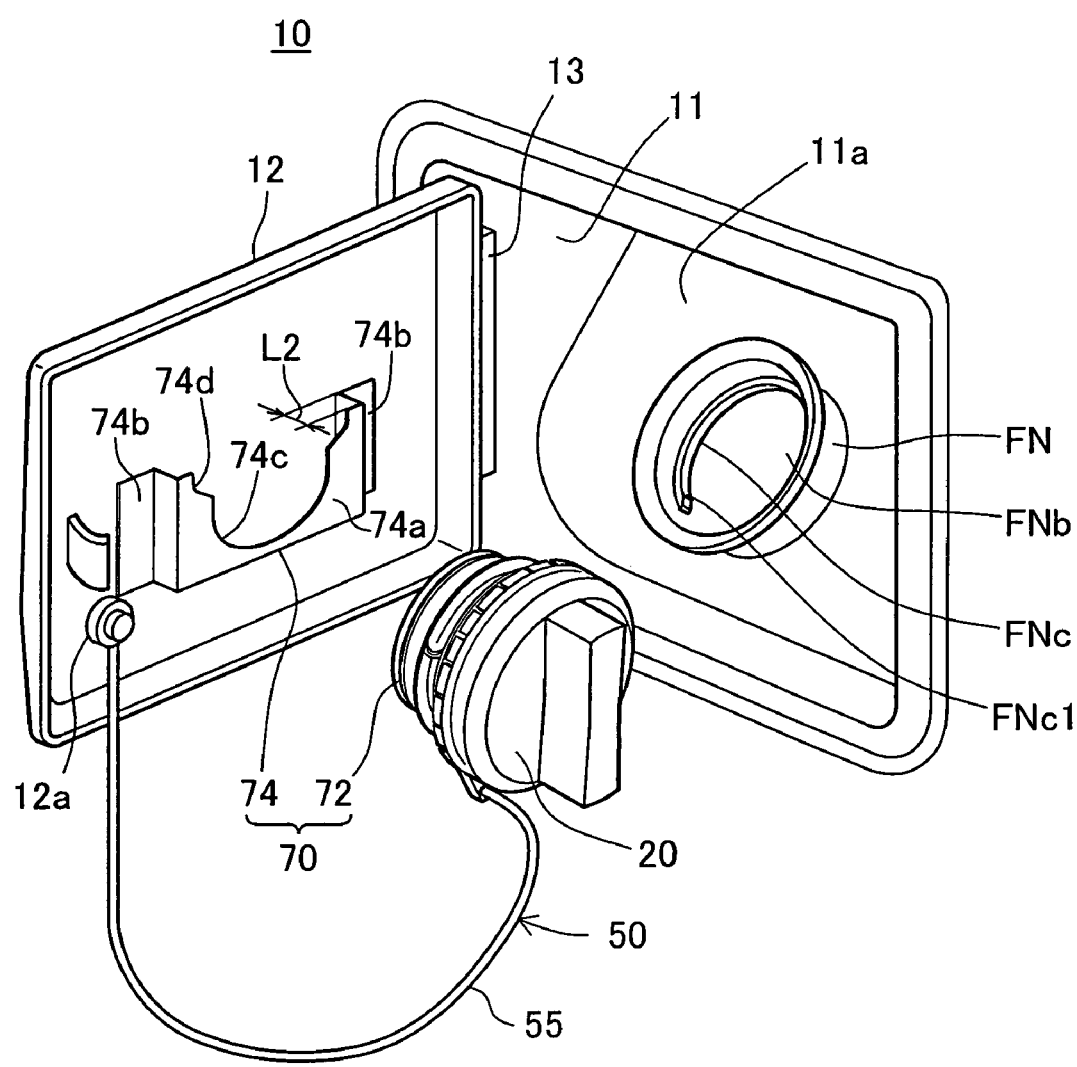
FIG. 1 is a perspective view showing a fuel cap in a detached state after opening a fueling lid on a rear side of a vehicle in one embodiment of the invention.

FIG. 1 is a perspective view showing a fuel cap 20 in a detached state after opening a fueling lid 12 on a rear side of a vehicle in one embodiment of the invention. An inlet box 11 for fuel supply is located in a rear portion of a body panel 10 and has its opening covered with the fueling lid 12. The fueling lid 12 is fastened to the inlet box 11 via a hinge 13 in a freely openable and closable manner. A fuel inlet FNb of a filler neck FN connecting with a fuel tank (not shown) is located in a bottom wall 11a of the inlet box 11. The fuel inlet FNb is opened and closed by the fuel cap 20.

Figure 2:
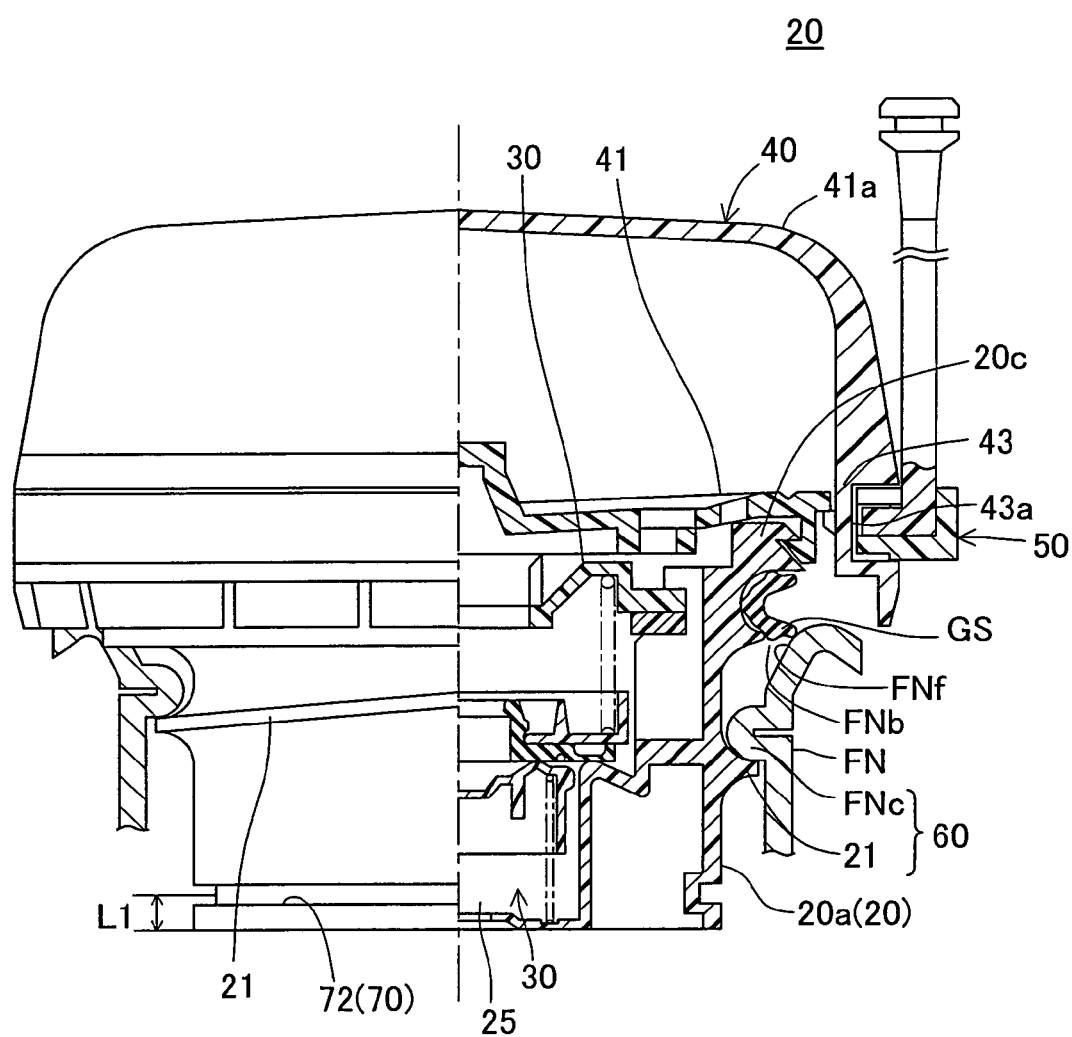
FIG. 2 is a half sectional view showing the fuel cap attached to a filler neck.

FIG. 2 is a half sectional view showing the fuel cap 20 attached to the filler neck FN. The fuel cap 20 includes a casing 20a fit in the filler neck FN, a pressure regulating valve 30 received in a valve chest 25 formed inside the casing 20a, a cover 40 that is mounted on the casing 20a and has a handle 41a that is manipulated with the thumb and the fingers for rotation of the cover 40, and a gasket GS arranged below a flange 20c. The fuel cap 20 also has a tether mechanism 50 mounted on the outer circumference of the cover 40, part of a screw mechanism 60 used to screw the fuel cap 20 to the filler neck FN, and an attachment groove 72 as part of a holder mechanism 70 used to temporarily keep the fuel cap 20 on the fueling lid 12 (see FIG. 1). As shown in FIG. 1, the tether mechanism 50 is used to link the fuel cap 20 detached from the filler neck FN to the fueling lid 12. One end of the tether mechanism 50 is set in a circular groove 43a (ring attachment element) formed on a side wall 43 of the cover 40 (see FIG. 2), while the other end is attached to the fueling lid 12.

At the time of fuel supply, the user opens the fueling lid 12 and rotates the fuel cap 20 relative to the filler neck FN via the screw mechanism 60 to detach the fuel cap 20 from the filler neck FN. The detached fuel cap 20 is linked to the fueling lid 12 via the tether mechanism 50 and is held on the fueling lid 12 via the holder mechanism 70.

(2) Structures of Respective Constituents (2)-1 Screw Mechanism 60

Figure 3:
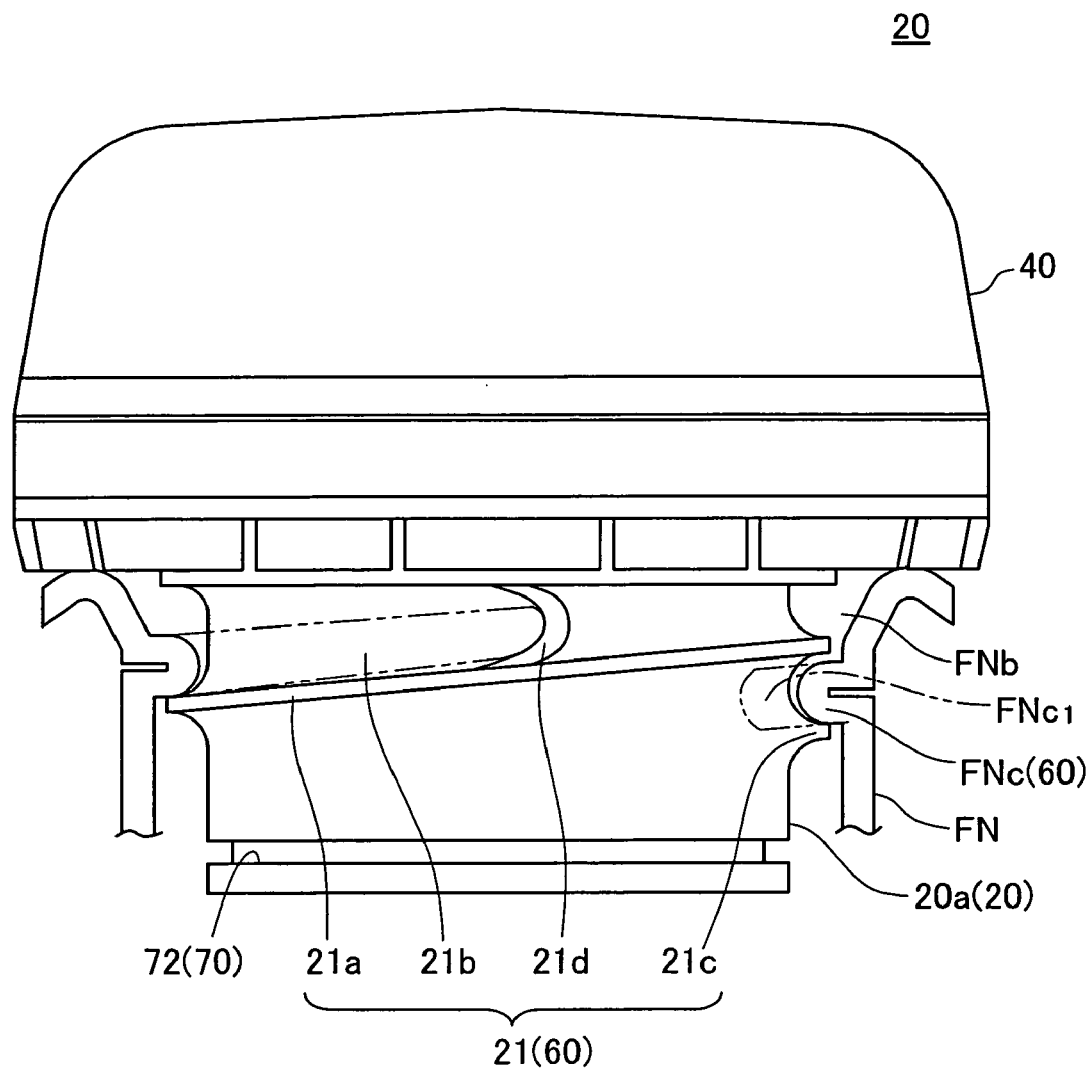
FIG. 3 shows the fuel cap attached to the filler neck.
Figure 4:
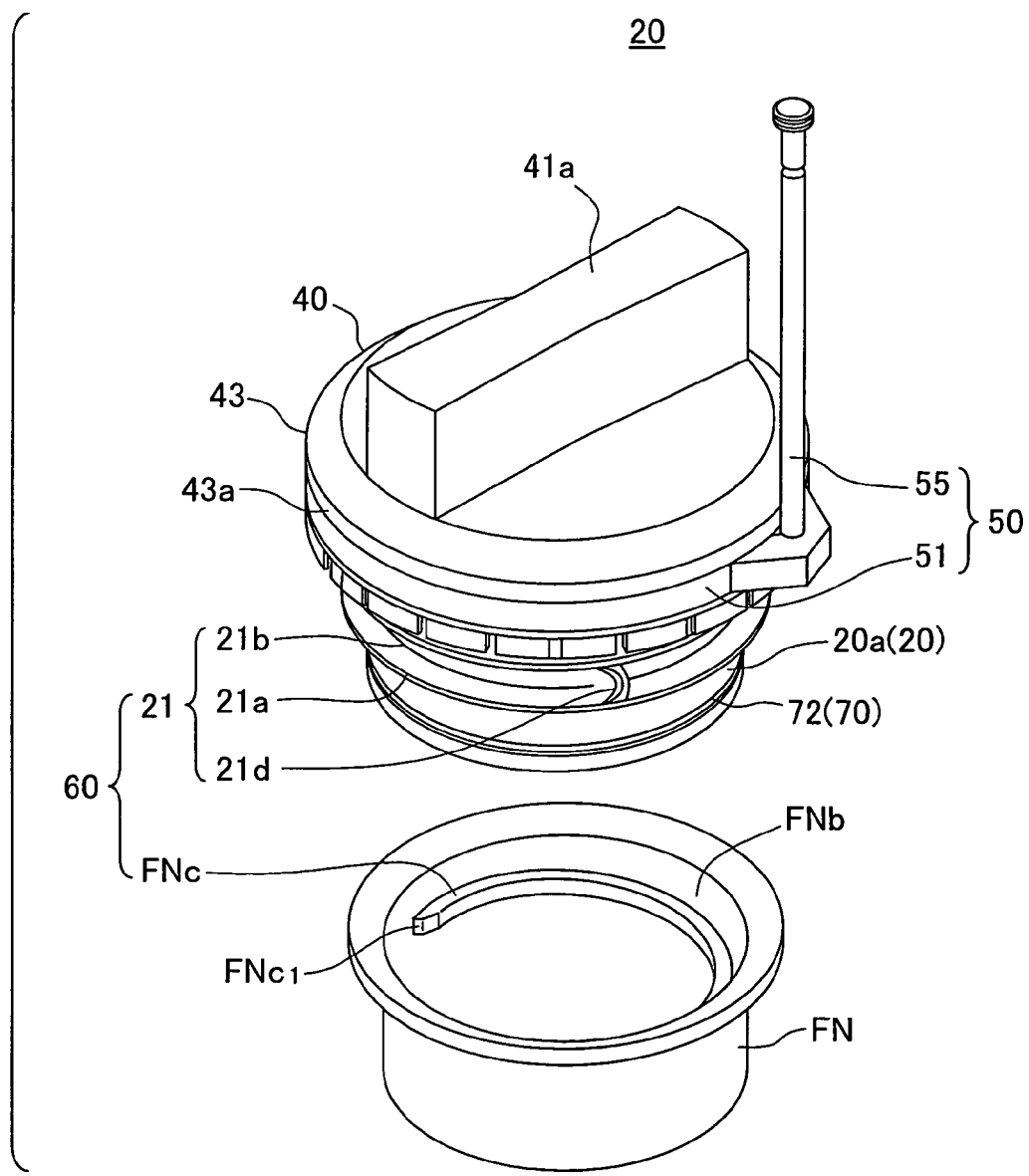
FIG. 4 is a perspective view showing the fuel cap prior to attachment to the filler neck.

FIG. 3 shows the fuel cap 20 attached to the filler neck FN. FIG. 4 is a perspective view showing the fuel cap 20 prior to attachment to the filler neck FN. The screw mechanism 60 includes a female thread element FNc formed on the inner wall of the filler neck FN, and a male thread element 21 formed on the outer circumference of the casing 20a. The female thread element FNc is a threading projection formed spirally from a leader FNc1 close to the fuel inlet FNb to the depth (to the side of the fuel tank). The female thread element FNc has only one turn at a pitch of 6.35 mm. The male thread element 21 has a thread ridge 21a and a thread groove 21b. The lower end of the thread ridge 21a forms a leader 21c that engages with the leader FNc1 of the female thread element FNc (see FIG. 3). A stopper 21d is formed upright to cross the thread groove 21b. The stopper 21d is located at a position of about 200 degrees from the leader 21c of the male thread element 21. When the fuel cap 20 is inserted into the fuel inlet FNb, the stopper 21d comes into contact with the leader FNc1 of the female thread element FNc to restrict further rotation of the fuel cap 20 in its closing direction.

In response to rotation of the fuel cap 20 set in the fuel inlet FNb in a closing direction, the male thread element 21 engages with and is screwed into the female thread element FNc. After compression of the gasket GS by at least a preset displacement in an axial direction, the stopper 21d hits against the leader FNc1 of the female thread element FNc to restrict further rotation. The fuel cap 20 accordingly closes the fuel inlet FNb in this state.

(2)-2 Tether Mechanism 50

(2)-2-1 Structure of Tether Mechanism 50

As shown in FIG. 4, the tether mechanism 50 has a rotating ring 51 and a cord-like flexible linkage member 55. The rotating ring 51 is mounted on an outer circumference of the side wall 43 of the cover 40. More specifically, the rotating ring 51 is fit in the circular groove 43a (the ring attachment element), which is formed over the whole circumference on the side wall 43 of the cover 40.

Figure 5:
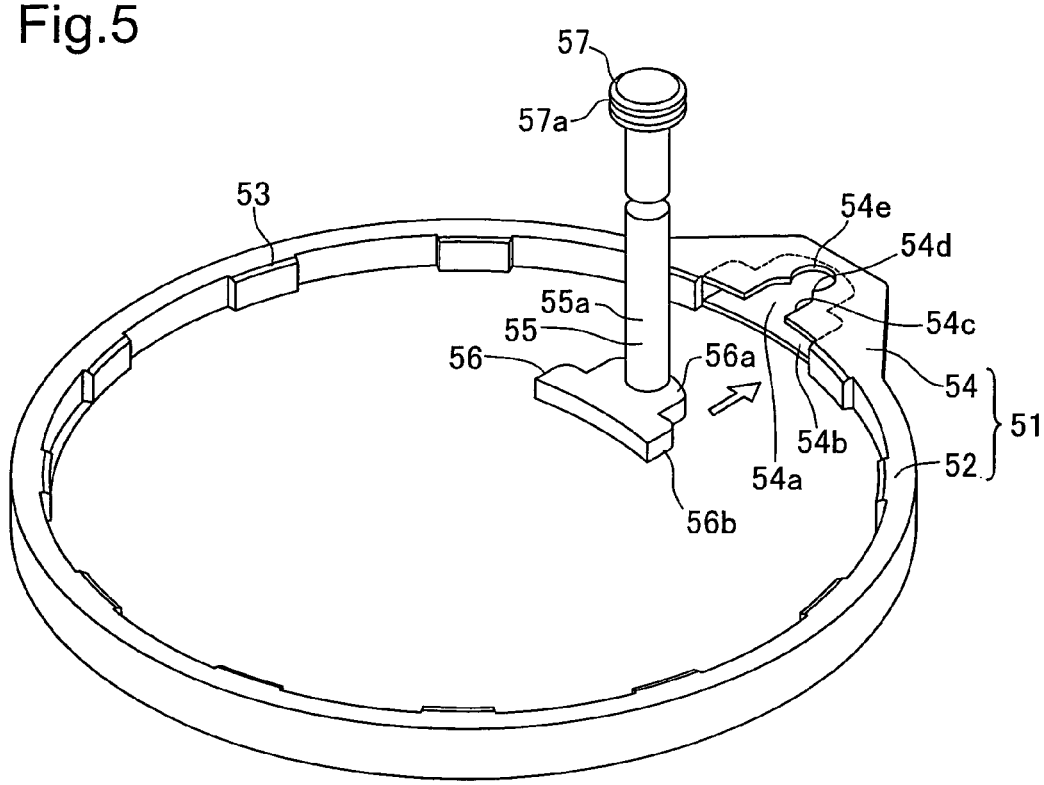
FIG. 5 is a decomposed perspective view showing a tether mechanism.

FIG. 5 is a decomposed perspective view showing the tether mechanism 50. The rotating ring 51 has a circular ring body 52 and a support member 54, to which the linkage member 55 is linked. The rotating ring 51 and the linkage member 55 are prepared by injection molding a thermoplastic resin (for example, PA or PP) or a thermoplastic elastomer (TPEE). The rotating ring 51 is demanded to have the shape-holding property for the good sliding ability relative to the circular groove 43a, and is desirably made of a material having a large hardness. The linkage member 55 is demanded, on the other hand, to have the flexibility for the smooth attachment of the fuel cap 20, and is desirably made of a flexible material having a small hardness. Multiple projections 53 are formed at an interval on the inner face of the ring body 52. These multiple projections 53 function to reduce the contact area of the rotating ring 51 with the circular groove 43a for the smooth rotation. Since the multiple projections 53 are configured such that an inner circumference of the first support end 56 does not come into contact with the circular groove 43a when the first support end 56 is held in the support recess 54a, the first support end 56 made of the softness resin material does not impede the rotation of the rotating ring 51.

The support member 54 is protruded radially outward from the ring body 52 for attachment of the linkage member 55, and has a support recess 54a. The support recess 54a is open upward and to the inner circumference of the ring body 52. The support recess 54a has an insertion opening 54b facing the inner circumference of the ring body 52, as well as a guide opening 54c, a neck element 54d, and a lead opening 54e formed upward in the axial direction.

The linkage member 55 has a cord-like flexible linkage body 55a with a first support end 56. The first support end 56 is integrally formed on one end of the linkage body 55a and is fit in the support recess 54a of the support member 54. The first support end 56 has a linkage base 56a from which the linkage body 55a is extended in the axial direction, and an enlarged element 56b extended from the linkage base 56a.

The other end of the linkage member 55 forms a second support end 57 with an engagement projection 57a. The engagement projection 57a is supported in a rotatable manner by a fixation element 12a, which is formed on the rear face of the fueling lid 12, as shown in FIG. 1.

(2)-2-2 Fixation of Tether Mechanism 50

Figure 6:
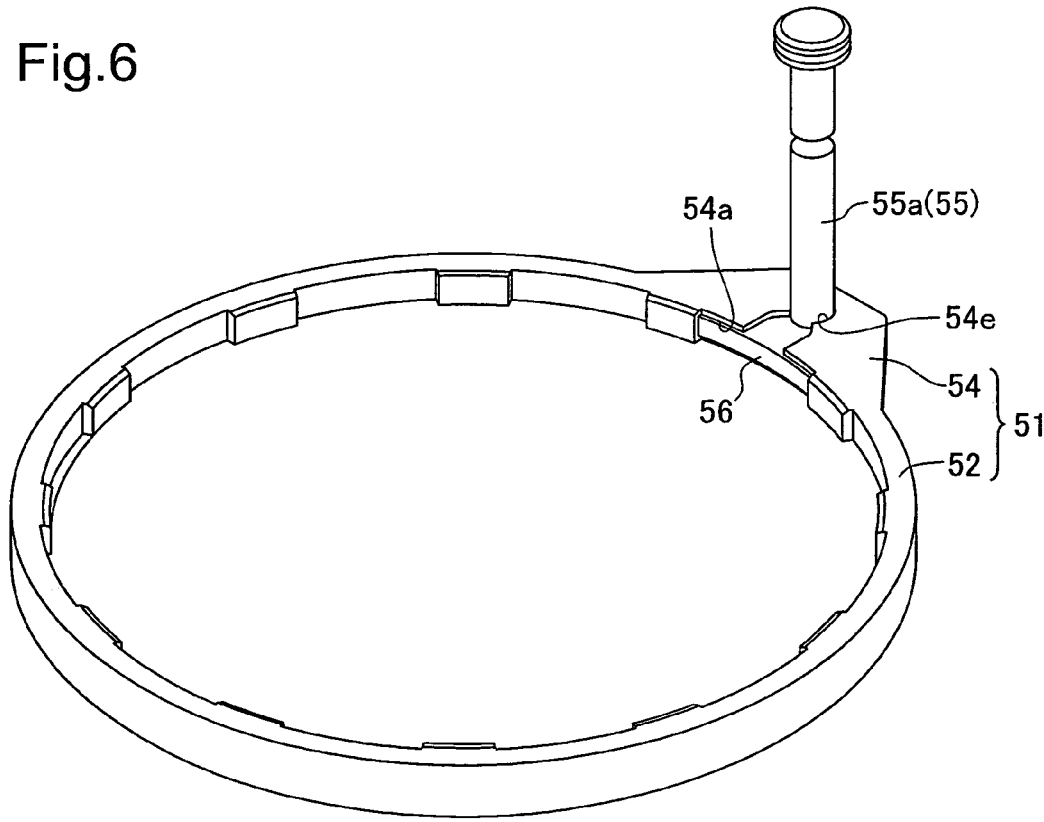
FIG. 6 is a perspective view showing fixation of the tether mechanism.

The first support end 56 of the linkage member 55 is fixed to the support member 54 of the rotating ring 51 according to the following procedure. The first support end 56 is moved radially outward from the center of the ring body 52 as shown in FIG. 5 to be set in the support recess 54a via the insertion opening 54b (this is the state of FIG. 6). The linkage body 55a moves through the guide opening 54c and the neck element 54d, reaches the lead opening 54e, and is led in the axial direction via the lead opening 54e. The first support end 56 is thus securely set in the support recess 54a.

A simple shift of the first support end 56 of the linkage member 55 outward in the radial direction from the inner circumference of the ring body 52 accordingly fixes the linkage member 55 to the support member 54. This arrangement easily attains automation of such fixation.

(2)-3 Holder Mechanism 70

(2)-3-1 Structure of Holder Mechanism 70

As shown in FIG. 1, the fuel cap 20 and the fueling lid 12 have the holder mechanism 70 formed to temporarily hold the fuel cap 20 on the fueling lid 12. The holder mechanism 70 has the attachment groove 72 (see FIG. 2) formed on the lower portion of the outer circumference of the casing 20a and a cap holder 74 fixed to the rear face of the fueling lid 12. The attachment groove 72 is formed over the whole circumference of the casing 20a and is arranged to be apart from the male thread element 21 by a preset distance L1.

As shown in FIG. 1, the cap holder 74 has a holder body 74a and a pair of fixation elements 74b,74b formed on both sides of the holder body 74a. The fixation elements 74b,74b are fixed to the rear face of the fueling lid 12 by spot welding or another suitable technique. The holder body 74a is arranged to be apart from the rear face of the fueling lid 12 by a distance L2, which is slightly greater than the distance L1 (see FIG. 2). The holder body 74a has an arc-shaped support element 74c and a guide element 74d, which connects with the support element 74c and is expanded upward. The holder body 74a has a thickness to be fit in the attachment groove 72 of the casing 20a. The radius of the arc of the support element 74c is set to substantially match the outer diameter of the bottom of the attachment groove 72.

(2)-3-2 Attachment of Fuel Cap 20 to Holder Mechanism 70

The user holds the handle 41a, rotates the fuel cap 20 in its opening direction, and detaches the fuel cap 20 from the filler neck FN. The detached fuel cap 20 is held on the fueling lid 12 according to the following procedure. The lower end of the casing 20a is pressed against the rear face of the fueling lid 12, while being moved downward along the guide element 74d. The attachment groove 72 of the casing 20a is guided along the guide element 74d and is inserted into the support element 74c. The lower end of the casing 20a accordingly comes into contact with the rear face of the fueling lid 12, while the support element 74c is set in the attachment groove 72. The fuel cap 20 is thus held on the rear face of the fueling lid 12.

(2)-3-3 Functions and Effects of Holder Mechanism 70 of Fuel Cap 20

(1) During the fuel supply operation, the fuel cap 20 detached from the fuel inlet FNb is temporarily kept by the holder mechanism 70. This structure effectively prevents the fuel cap 20 from being lost. The fuel cap 20 is held on the rear face of the fueling lid 12. This arrangement desirably prevents the body panel 10 from being stained with gasoline on the casing 20a.

(2) The male thread element 21 formed on the casing 20a of the fuel cap 20 has only one turn. The attachment groove 72, which is provided independently of the male thread element 21, assures secure attachment of the fuel cap 20 to the rear face of the fueling lid 12.

(3) The attachment groove 72 of the holder mechanism 70 is located between the lower end of the casing 20a and the male thread element 21. The attachment groove 72 thus does not interfere with attachment of the fuel cap 20 to the fuel inlet FNb, that is, engagement of the male thread element 21 on the fuel cap 20 with the female thread element FNc formed on the inner wall of the fuel inlet FNb. The attachment groove 72 is readily manufactured simultaneously with the casing 20a by injection molding.

(4) The holder mechanism 70 does not require a thick board to engage with the male thread element 21 of the casing 20a, but uses the cap holder 74 of a thin plate to be set in the exclusive attachment groove 72.

Figure 7:
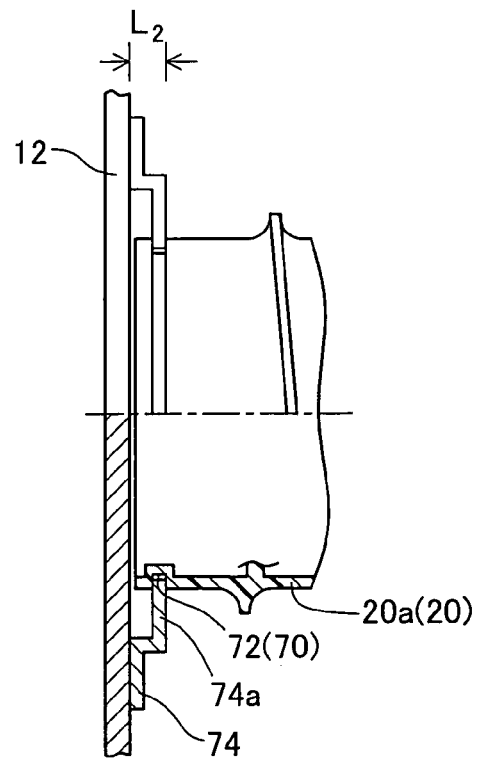
FIG. 7 shows the fuel cap held on a fueling lid.
Figure 8:
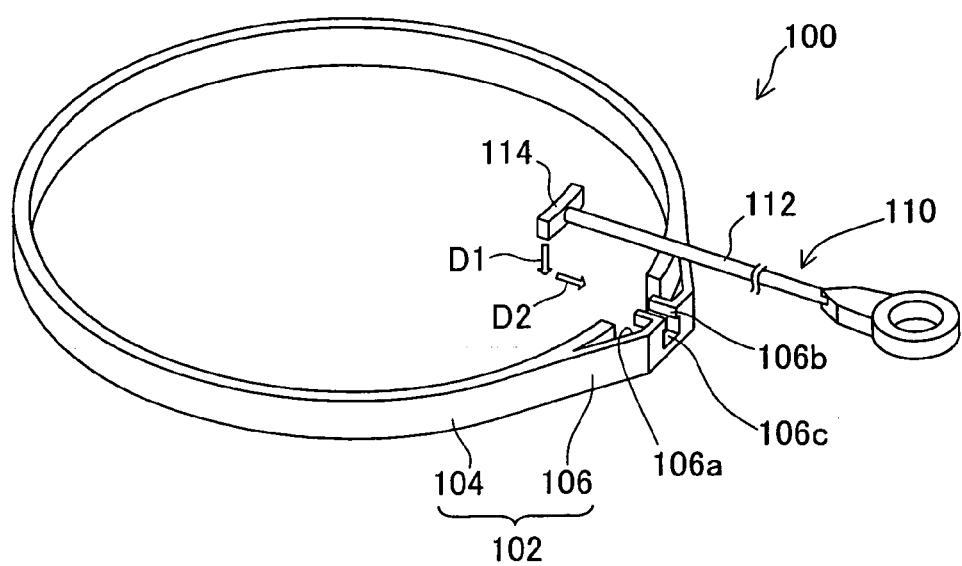
FIG. 8 shows a tether mechanism of a prior art structure.

(5) FIG. 7 shows the fuel cap 20 held on the fueling lid 12. The fuel cap 20 is kept by the fueling lid 12 by fitting the cap holder 74 in the attachment groove 72. The attachment groove 72 is apart from the end of the casing 20a by the relatively short distance L1 (see FIG. 2). This shortens the depth of the cap holder 74 or the distance L2 and effectively prevents the cap holder 74 from interfering with the fuel cap 20 set in the filler neck FN, thus reducing the space in depth of the inlet box.

The embodiment discussed above is to be considered in all aspects as illustrative and not restrictive. There may be many modifications, changes, and alterations without departing from the scope or spirit of the main characteristics of the present invention.

All changes within the meaning and range of equivalency of the claims are intended to be embraced therein. The scope and spirit of the present invention are indicated by the appended claims, rather than by the foregoing description.

What is claimed is:

1. A cap device equipped with a tether mechanism for linking a cap used to open and close a tank opening to a peripheral member of the tank opening, the tether mechanism comprising:
a rotating ring having a ring body that is mounted in a rotatable manner on a ring attachment element formed around an outer circumference of the cap, and a support member that is formed in the ring body; and
a linkage member having (i) a cord-like flexible linkage body, (ii) a first support end that is formed on one end of the linkage body and is coupled with the support member, and (iii) a second support end that is formed on the other end of the linkage body and is connectable with the peripheral member of the tank opening,
wherein the support member has:
a support recess that holds the first support end, and has an insertion opening, a lead opening arranged adjacent to and radially outwardly from the insertion opening and a guide opening that connects the insertion opening with the lead opening, the insertion opening being configured to allow the first support end to be inserted outward in the radial direction from a center of the ring body, the lead opening being configured to enable the linkage body to be led in an axial direction of the ring body, the guide opening being configured to guide the linkage body from the insertion opening to the lead opening, wherein
the lead opening and the guide opening open in the axial direction,
the guide opening has a neck element, wherein the neck element elastically deforms the linkage body and prevents the first support end held in the support recess from being pulled out from the lead opening when the linkage body is set in the axial direction and the first support end is set to face the insertion opening, and then the linkage body and the first support end move in the radial direction,
the ring body includes multiple projections on an inner circumference of the ring body, the multiple projections being configured to reduce a contact area of the ring body against the ring attachment element, and being configured such that an inner circumference of the first support end does not come into contact with the ring attachment element in a state which the first support end is held in the support recess.

2. The cap device in accordance with claim 1, wherein the ring body is made of an elastically deformable resin material and is mounted on the ring attachment element by applying an external force for expansion of a diameter of the ring body and subsequently removing the external force for contraction of the diameter.

3. The cap device in accordance with claim 1, the rotating ring is made of a resin material harder than a resin material of the linkage member.

4. A tether mechanism for a cap comprising:
a rotating ring having a ring body that is mounted in a rotatable manner around an outer circumference of the cap and that defines a ring body support member; and
a linkage member having a cord-like flexible linkage body, a first support end that is formed on a first end of the linkage body for seating the linkage body to the ring body support member, and a second support end that is formed on a second end of the linkage body and that is connectable to a tank opening peripheral member, wherein
the ring body support member includes
a support recess for holding the first support end of the linkage member,
an insertion opening that opens inwardly toward a center of the ring body and that is configured to enable insertion of the first support end of the ring body into the support recess, and
a lead opening oriented orthogonally relative to the insertion opening and being configured to secure the linkage body in an axial orientation relative to the ring body.

5. The tether mechanism in accordance with claim 4, wherein the ring body support member includes a guide opening that is oriented orthogonally relative to the insertion opening, that is in communication with the insertion opening, and that is configured to guide the linkage body from the insertion opening to the lead opening, and
at least one neck element positioned between the guide opening and the lead opening for securing the linkage body within the insertion opening.

6. The tether mechanism in accordance with claim 4, wherein the ring body includes multiple projections on an inner circumference thereof, the multiple projections being configured to reduce a contact area of the ring body with the outer circumference of the cap.

7. The tether mechanism in accordance with claim 6, wherein at least one of the multiple projections is positioned adjacent to the insertion opening.

* * * * *